Patented Jan. 11, 1949

2,458,741

UNITED STATES PATENT OFFICE 2,458,741

PREPARATION OF METHOXY ACETIC ACID

Louis Schmerling, Riverside, Ill., assignor to Universal Oil Products Company, Chicago, Ill., a corporation of Delaware No Drawing. Application September 15, 1945, Serial No. 616,651

1 Claim. (Cl. 260—535)

This invention relates to a process for preparing alkoxyalkanoic acids including monobasic and polybasic acids.

An object of this invention is to prepare alkoxyalkanoic acids in the absence of alkaline materials.

Another object of this invention is to prepare alkoxyalkanoic acids by reacting a monohaloalkanoic acid with an alcohol having a hydrogen atom combined with a carbon atom to which a hydroxyl group is bound.

In one specific embodiment of the present invention alkoxyalkanoic acids are prepared by the method which comprises reacting a monohaloalkanoic acid at a temperature of from about 50° to about 350° C. with an alcohol having a hydrogen atom combined with a carbon atom to which a hydroxyl group is bound.

Heretofore alkoxyalkanoic acids have been prepared by reacting a halo-alkanoic acid with an alkali metal alcoholate or alkaline earth metal alcoholate to form the desired alkoxyalkanoic acid and also an alkali or alkaline earth metal halide. The halogen present in the halo-alkanoic acid was thus converted into an inorganic halide of relatively low value. In my process the halogen present in the halo-alkanoic acid is converted into an alkyl halide, the alkyl group of which is derived from the alkanol charged. The alkyl halide so formed as a by-product is generally more valuable than the inorganic halide produced by the methods previously used.

I have found that alkoxyalkanoic acids are readily prepared by reacting a primary or secondary alkanol and a halo-alkanoic acid at a temperature of from about 50° to about 350° C. and at a pressure of from substantially atmospheric to about 100 atmospheres.

Alcohols utilizable in my process have a hydrogen atom combined with a carbon atom to which a hydroxyl group is bound. Such alcohols include particularly primary and secondary monohydric alkanols and also polyhydric alcohols such as glycol, glycerol, sorbitol, etc. These polyhydric alcohols contain primary and secondary alcohol groups, that is, they have a hydrogen atom combined with a carbon atom to which a hydroxyl group is joined chemically. Unsaturated alcohols such as allyl alcohol are also utilizable.

The reaction of a monohydric alkanol with a monohalo-alkanoic acid is illustrated by the following equations showing the products formed by interacting monochloro acetic acid with a molar excess of methanol.

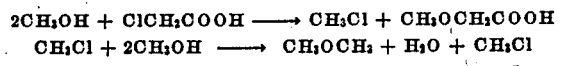

Similarly the reaction of secondary butyl alcohol and β-chloropropionic acid is illustrated by the equation:

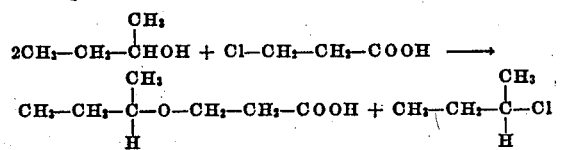

These equations show that the formation of an alkoxy-alkanoic acid is accompanied by the production of an alkyl chloride and a dialkylether which are also valuable in themselves or as intermediates in organic synthesis.

My process also is useful for the preparation of certain polybasic acids suitable for use as intermediates in the manufacture of resins and plastics. Thus, polybasic alkoxyalkanoic acids are formed by reacting a polyhydroxy alkane such as glycol, glycerol, sorbitol, and other polyhydric alcohols with a halo-alkanois acid. Such as reaction of monochloroacetic acid with glycol is illustrated by the following equation:

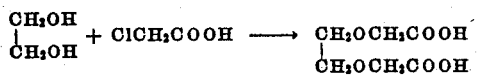

Dioxane is a by-product of this reaction, but is not illustrated by the above equation.

My process for producing alkoxyalkanoic acids is carried out using either batch or continuous types of operation. In batch type treatment the monohalo-alkanoic acid and an excess of an alcohol are heated in an autoclave at a temperature of from about 50° to about 350° C. and at a pressure generally not in excess of about 100 atmospheres. I prefer to employ a reaction temperature of from about 180° to about 250° C. but the exact temperature used is dependent upon the nature of the reactants.

Also my process is carried out continuously by conducting a mixture of a monohalo-alkanoic acid and an alcohol of the type herein described through a reactor maintained at the above indicated conditions of temperature and pressure. The reactor preferably contains baffles or mixing devices, or it contains a packing material such as crushed porcelain, pumice, quartz chips, etc., to serve mainly as a mixing device rather than as a catalyst. The reaction mixture which is directed from such a continuous reactor is then subjected to fractional distillation or other separating means to separate the alkoxyalkanoic acid and by-products such as alkyl halide and ether from unconverted alkanol. The unconverted alkanol so recovered is then recycled to the process.

The following example is given to illustrate the process of my invention, but with no intention of unduly limiting its scope.

30 grams of monochloro acetic acid and 50 grams of methanol were placed in a glass-lined autoclave which was rotated and heated at 200° C. for four hours. The reaction product was then removed from the autoclave and found to contain unreacted methanol and water, 10 grams of methoxy acetic acid boiling at 194–196° C. and 26 grams of a mixture of methyl chloride and dimethylether.

The nature of the present invention and its commercial utility are evident from the preceding specification and example, although neither section is to be considered as limiting unduly the broad scope of the invention.

I claim as my invention:

A process for preparing methoxyacetic acid which comprises non-catalytically reacting monochloro acetic acid with a molar excess of methanol at a temperature of from about 180° to about 250° C.

LOUIS SCHMERLING.

REFERENCES CITED

The following references are of record in the file of this patent:

UNITED STATES PATENTS

| Number | Name | Date |
|---|---|---|
| 2,210,564 | Andrussow et al. | Aug. 6, 1940 |

OTHER REFERENCES

Stoermer et al.: "Ber. Deut. Chem.," vol. 47, pages 1791–1793.

Karrer: "Organic Chemistry" (Nordeman, 1938), pages 103–104.